(12) United States Patent
Becerra et al.

(10) Patent No.: US 9,979,341 B2
(45) Date of Patent: May 22, 2018

(54) METHODS AND SYSTEMS FOR PROGRAMMING AN ELECTRIC MOTOR

(71) Applicant: Regal Beloit America, Inc., Beloit, WI (US)

(72) Inventors: Roger Carlos Becerra, Fort Wayne, IN (US); Ludovic Andre Chretien, Columbia City, IN (US); Glen Chester Young, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 307 days.

(21) Appl. No.: 13/839,257

(22) Filed: Mar. 15, 2013

(65) Prior Publication Data

US 2014/0265989 A1    Sep. 18, 2014

(51) Int. Cl.
*H02P 21/18*    (2016.01)
*H02P 23/00*    (2016.01)

(52) U.S. Cl.
CPC ...... *H02P 23/0036* (2013.01); *H02P 23/0004* (2013.01)

(58) Field of Classification Search
CPC ...... H02M 3/33507; H02M 1/12; H02M 1/32; H02P 23/0036; H02P 23/0004
USPC .................. 318/799, 503; 702/182
See application file for complete search history.

(56) References Cited

U.S. PATENT DOCUMENTS

| | | | |
|---|---|---|---|
| 3,202,875 A * | 8/1965 | Bateman | H02H 3/422 361/44 |
| 3,579,280 A * | 5/1971 | Florance | G01R 27/18 324/127 |
| 4,093,998 A * | 6/1978 | Miller | 711/103 |
| 4,151,575 A * | 4/1979 | Hogue | H02H 7/09 361/33 |
| 4,761,600 A | 8/1988 | D'Atre et al. | |
| 5,565,912 A | 10/1996 | Easterly et al. | |
| 5,656,912 A * | 8/1997 | Yang | 318/808 |

(Continued)

FOREIGN PATENT DOCUMENTS

CN    101677226 A    3/2010
CN    101910633 A    12/2010
(Continued)

OTHER PUBLICATIONS

1st CN Office Action for Chinese Patent Application No. 2014101634413 dated Sep. 5, 2017; 9 pages; with English Translation, 7 pages.

*Primary Examiner* — Bentsu Ro
*Assistant Examiner* — Devon Joseph
(74) *Attorney, Agent, or Firm* — Armstrong Teasdale LLP

(57) ABSTRACT

Methods and systems for programming an electric motor are provided. An electric motor controller configured to be coupled to an electric motor is configured to control the electric motor to produce torque when direct current (DC) link voltage has up to 100% voltage ripple. The controller includes a first power input, a second power input, and a third power input, an energized line detection device, and a microprocessor. Each power input is configured to receive power from an alternating current (AC) power source. The energized line detection device is configured to sense which power input has received power from the AC power source and output an isolated signal. The microprocessor is coupled downstream from the energized line detection device and is configured to determine an operating profile for the electric motor based on the isolated signal.

14 Claims, 6 Drawing Sheets

(56) References Cited

U.S. PATENT DOCUMENTS

| | | | |
|---|---|---|---|
| 5,818,194 A * | 10/1998 | Nordby | 318/701 |
| 6,049,258 A * | 4/2000 | Fawal | H01F 17/0006 333/177 |
| 6,215,261 B1 | 4/2001 | Becerra | |
| 6,541,954 B1 * | 4/2003 | Gluszek | G01R 29/16 323/277 |
| 6,768,284 B2 | 7/2004 | Lee et al. | |
| 6,828,746 B2 | 12/2004 | Kumar | |
| 7,095,208 B2 | 8/2006 | Kawaji et al. | |
| 7,557,543 B2 | 7/2009 | Prakash et al. | |
| 7,650,760 B2 | 1/2010 | Nakata et al. | |
| 7,670,253 B2 | 3/2010 | Sah | |
| 7,737,646 B2 * | 6/2010 | Fulton et al. | 318/139 |
| 7,739,016 B2 | 6/2010 | Morris | |
| 7,865,287 B2 | 1/2011 | Huseman | |
| 7,908,064 B2 | 3/2011 | Cawthorne et al. | |
| 7,977,896 B2 | 7/2011 | Heap et al. | |
| 7,987,934 B2 | 8/2011 | Huseman | |
| 7,990,092 B2 | 8/2011 | Woodward | |
| 8,010,263 B2 | 8/2011 | Morris | |
| 8,049,459 B2 | 11/2011 | Woodward | |
| 8,050,821 B2 | 11/2011 | Morris et al. | |
| 8,140,230 B2 | 3/2012 | Haggerty et al. | |
| 8,195,352 B2 | 6/2012 | Morris | |
| 8,373,394 B1 * | 2/2013 | Huta | G05F 1/70 323/211 |
| 8,975,856 B2 * | 3/2015 | Hirt | H02P 23/26 318/400.13 |
| 9,201,104 B2 * | 12/2015 | Jackson | G01R 21/133 |
| 2002/0105335 A1 * | 8/2002 | Mir | B62D 5/046 324/503 |
| 2003/0042865 A1 * | 3/2003 | Mayhew | H02P 1/24 318/727 |
| 2008/0309269 A1 * | 12/2008 | Kausch | 318/400.38 |
| 2009/0206818 A1 * | 8/2009 | Horan | H02M 5/257 323/311 |
| 2010/0060228 A1 * | 3/2010 | Woodward | H02P 1/04 318/799 |
| 2010/0109436 A1 * | 5/2010 | Lanni | 307/31 |
| 2011/0148563 A1 * | 6/2011 | Tsai | H01F 27/2804 336/200 |
| 2011/0241580 A1 * | 10/2011 | Winterhalter | H02P 27/06 318/400.3 |
| 2011/0260666 A1 * | 10/2011 | Woodward | 318/433 |
| 2011/0264409 A1 * | 10/2011 | Jayanth | F04B 35/04 702/182 |
| 2012/0067561 A1 * | 3/2012 | Bergman | B60H 1/00657 165/257 |
| 2012/0091938 A1 * | 4/2012 | Knezevic et al. | 318/490 |
| 2015/0212137 A1 * | 7/2015 | Radan | G01R 31/025 324/537 |
| 2017/0012423 A1 * | 1/2017 | Arritt | H02H 3/253 |

FOREIGN PATENT DOCUMENTS

| | | |
|---|---|---|
| EP | 1429450 B1 | 2/2008 |
| EP | 1843463 B1 | 7/2013 |
| JP | 4416486 B2 | 2/2012 |
| KR | 101006589 B1 | 1/2011 |

* cited by examiner

METHODS AND SYSTEMS FOR PROGRAMMING AN ELECTRIC MOTOR

BACKGROUND

The field of the invention relates generally to electric motors, and more specifically, to methods and systems for programming electric motors.

A typical heating, ventilation, and air conditioning (HVAC) application consists of a thermostat, a furnace or fan coil, a system controller, and a fan motor. User settings and current temperature measurements are used by the thermostat to provide the system controller with signals indicating the mode in which the HVAC application should operate. For example, a user may input into the thermostat a desired temperature of 67 degrees F. If the measured temperature of the room is 60 degrees F., the thermostat would signal the system controller to enter a heating mode.

The system controller energizes the fan motor via a set of relays based on the information provided to the system controller by the thermostat. Typically, certain known HVAC applications, such as residential HVAC systems, include a permanent split capacitor (PSC) electric motor to force airflow. The speed of the PSC motor is adjusted by taps on the motor winding. When the line voltage is applied to a lower turn count tap in the induction motor, the reduced stator flux produced results in a lower rotor speed under load, resulting in much inefficiency when using the PSC motor.

Some HVAC systems have begun using variable speed motors that can be electronically controlled to match the airflow requirements of the system to improve efficiency. However, retrofitting the PSC motor with a variable speed motor is costly, time-consuming, and requires complex changes to be made to the wiring and control system. Additionally, HVAC original equipment manufacturers (OEMs) typically require electric motors with unique parameters (i.e., torque, speed, airflow direction), so the motor can be customized to the particular system in which it is installed. Changing the operating parameters after manufacture is also a time-consuming and difficult process. As a result, electric motor manufacturers and installers keep an extensive inventory of motors to accommodate for the large variety of different HVAC systems.

BRIEF DESCRIPTION

In one aspect, an electric motor controller configured to be coupled to an electric motor is provided. The controller is configured to control the electric motor to produce torque when direct current (DC) link voltage has up to 100% voltage ripple. The controller includes a first power input, a second power input, and a third power input, an energized line detection device, and a microprocessor. Each power input is configured to receive power from an alternating current (AC) power source. The energized line detection device is configured to sense which power input has received power from the AC power source and output an isolated signal. The microprocessor is coupled downstream from the energized line detection device and is configured to determine an operating profile for the electric motor based on the isolated signal.

In another aspect, a method of programming an electric motor using a motor controller is provided. The motor controller is configured to control the electric motor to produce torque when direct current (DC) link voltage has up to 100% voltage ripple. The method includes receiving power from an alternating current (AC) power source by at least one of a first power input, a second power input, and a third power input. The method also includes sensing, by an energized line detection device, which of the power inputs received power from the AC power source. The method further includes receiving an isolated signal output by the energized line detection device at a microprocessor, and determining an operating profile for the electric motor based on the isolated signal.

In yet another aspect, a heating, ventilation, and air conditioning (HVAC) fan motor control system is provided. The HVAC control system includes an HVAC system controller configured to determine an operating mode of the HVAC fan motor control system, an electric fan motor, and an electric motor controller coupled to the electric motor. The motor controller is configured to control the electric motor to produce torque when direct current (DC) link voltage has up to 100% voltage ripple. The motor controller includes a first power input, a second power input, and a third power input, an energized line detection device, and a microprocessor coupled downstream from the energized line detection device. Each power input is configured to receive power from an alternating current (AC) power source. The energized line detection device is configured to sense which of the power inputs has received power from the AC power source and output an isolated signal. The microprocessor is configured to determine an operating profile for the electric motor based on the isolated signal.

DETAILED DESCRIPTION

Figure 1:
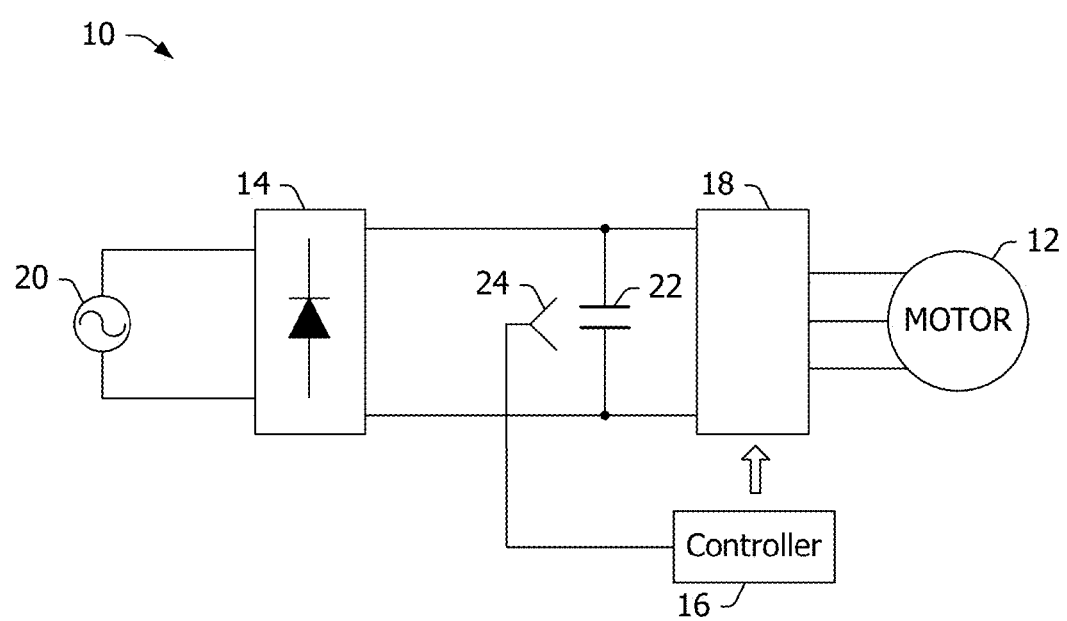
FIG. 1 is a functional diagram of a motor controller that may be used for operating an electric motor.

FIG. 1 is a functional diagram of a motor controller 10 that may be used for operating an electric motor 12. In the exemplary embodiment, motor controller 10 includes a rectifier 14, a controller 16, and an inverter 18. Motor controller 10 is coupled to a power supply 20 for receiving input power to drive electric motor 12. Electric motor 12 is coupled to and drives a load (not shown).

In the exemplary embodiment, power supply 20 supplies a single-phase alternating current (AC) voltage to motor controller 10. Rectifier 14 receives an AC input voltage from a power supply 20 and rectifies it to produce a pulsed DC voltage. Inverter 18 conditions the pulsed DC voltage, and supplies it to electric motor 12, which uses the power to drive the load. In the exemplary embodiment, inverter 18 converts the pulsed DC voltage to a three-phase AC voltage. Alternatively, inverter 18 converts the pulsed DC voltage to any type of voltage that enables motor controller to function as described herein.

In some embodiments, motor controller 10 includes a low-capacitance capacitor 22 for storing small amounts of energy when input voltage is available. Capacitor 22 may have a capacitance between about 0.1 µF/kW and about 10 µF/kW. The use of bulky, unreliable electrolytic filter capacitors in motor controller 10 is avoided. In some embodiments, capacitor 22 is configured to filter out switching frequency harmonics of electric motor 12. In other embodiments, the low-capacitance of capacitor 22 reduces inrush input current to electric motor 12. Further, capacitor 22 facilitates motor controller 10 increasing line input power factor.

Motor controller 10 also includes a voltage sensor 24 coupled across capacitor 22. Voltage sensor 24 is configured to measure a DC link voltage being output by rectifier 14. Voltage sensor 24 provides the DC link voltage measurement to controller 16 for use in controlling electric motor 12 to produce torque when DC link voltage has up to, and including, 100% voltage ripple.

The absence of a filter capacitor in motor controller 10 enables DC link voltage drops to zero or near zero each time the AC input voltage transits zero. Typically, when DC link voltage drops to zero (referred to as "100% voltage ripple"), regeneration and braking may occur in electric motor 12, which may cause undesired effects in electric motor 12. In the exemplary embodiment, controller 16 is configured to control electric motor 12 to produce torque when input voltage is one of approaching zero and equal to zero. More specifically, in the exemplary embodiment, controller 16 is configured to control electric motor 12 to produce torque when DC link voltage has up to 100% voltage ripple.

The removal of filter large filter capacitors in motor controller 16 facilitates determining a desired direction of rotation of electric motor 12. With the low capacitance across the DC link, in combination with a single phase AC source, the amount of ripple voltage on capacitor 22 is sensitive to the load on electric motor 12. For example, a greater load produces a greater magnitude of ripple voltage. The relationship between DC link ripple voltage and the load is compared to an anticipated load for a desired direction of rotation to determine if electric motor 12 is rotating in the desired direction. Alternatively, DC link ripple voltage is compared between each of the two directions of rotation.

Figure 2:
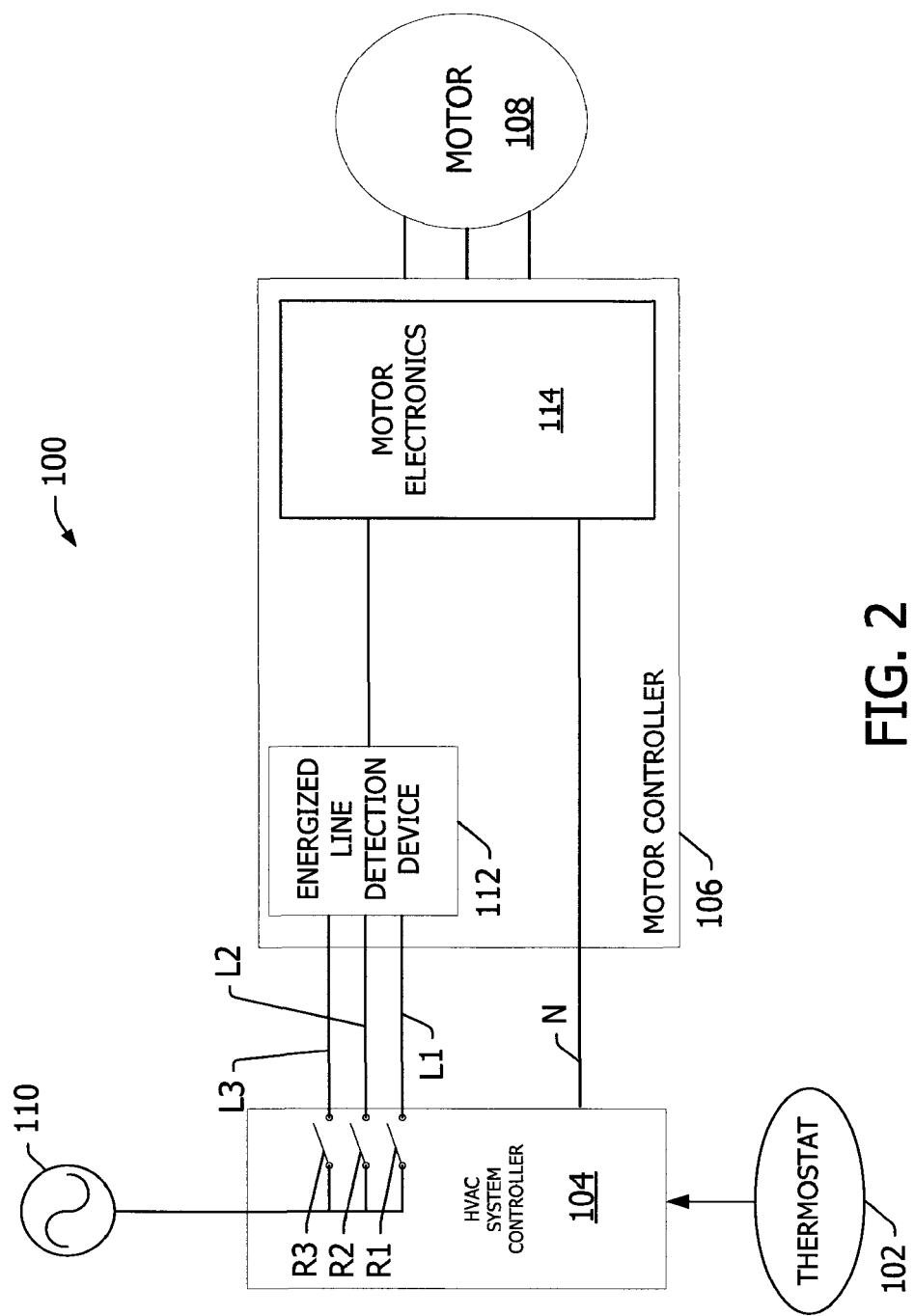
FIG. 2 is a block diagram of an exemplary heating, ventilation, and air conditioning (HVAC) fan motor control system.

FIG. 2 is a block diagram of an exemplary heating, ventilation, and air conditioning (HVAC) fan motor control system 100. HVAC fan motor control system 100 is included in an HVAC application (not shown in FIG. 2), such as, but not limited to, a residential HVAC system and/or a commercial HVAC system. Fan motor control system 100 includes a thermostat 102, an HVAC system controller 104, an electronic motor controller 106, and an electric fan motor 108. In the exemplary embodiment, electric motor 108 is an electrically commutated motor (ECM). Fan motor control system 100 is configured to be coupled to and receive power from a power supply 110. In the exemplary embodiment, power supply 110 is an alternating current (AC) power supply configured to provide 120 VAC (volts alternating current) or 240 VAC. However, in alternative embodiments, power supply 110 may provide any amount of power that enables fan motor control system 100 to function as described herein.

Thermostat 102 is configured to control the mode in which the HVAC application is operating, for example, a cooling mode, a heating mode, or a fan only mode. Typically, cooled air is circulated through the HVAC system when in the cooling mode, heated air is circulated through the HVAC system in the heating mode, and air that has not been heated or cooled is circulated through the HVAC system in the fan only mode. As described herein, fan motor control system 100 will be referred to as a three-speed system (i.e., system 100 has three operating speeds relating to the cooling, heating, and fan only modes). However, fan motor control system 100 is not limited to being a three-speed system. In alternative embodiments, fan motor control system 100 may operate at any number of speeds that enables system 100 to function as described herein.

The mode of operation is determined by thermostat 102 based on user selections and/or a measured temperature. For example, in one embodiment, thermostat 102 includes a switch that enables a user to select from "OFF," "COOL," or "HEAT" (not shown in FIG. 2). When "OFF" is selected, thermostat 102 signals HVAC system controller 104 to turn off the HVAC application. When "COOL" or "HEAT" is selected, thermostat 102 signals HVAC system controller 104 to operate the HVAC application in cooling mode or in heating mode, cooling mode, or fan only mode depending upon the current measured temperature and the set desired temperature. Thermostat 102 may include a temperature sensing device, for example, a thermistor, or may be coupled to a temperature sensing device (not shown in FIG. 2) positioned remotely from thermostat 102.

Thermostat 102 may also include a switch that enables a user to select fan modes, for example, either "ON" or "AUTO" (not shown in FIG. 2). When "ON" is selected, thermostat 102 signals HVAC system controller 104 to continuously operate the fan. When "AUTO" is selected, the signal sent from thermostat 102 to HVAC system controller 104 depends upon the measured temperature and the set desired temperature, and the fan may either be on or off.

Thermostat 102 provides a signal to HVAC system controller 104. The signal may include a call for cooling, heating, or fan only operation of the HVAC application. HVAC system controller 104 includes four outputs coupled to motor controller 106, a neutral line N, a fan line L1, a heating line L2, and a cooling line L3. HVAC system controller 104 also includes a relay R1 coupled to line L1, a relay R2 coupled to line L2, and a relay R3 coupled to line L3. When HVAC system controller 104 receives a heating signal from thermostat 102, HVAC system controller 104 closes relay R2 and delivers either 120V or 240V over line L2 to motor controller 106. When HVAC system controller 104 receives a cooling signal from thermostat 102, HVAC system controller 104 closes relay R3 and delivers either 120V or 240V over line L3 to motor controller 106. Fan mode, heating mode, and cooling mode are not limited to being associated with line L1, line L2, and line L3, respectively. Alternatively, any of the fan, heating, and cooling modes may be associated with any of lines L1, L2, and L3.

In the exemplary embodiment, motor controller 106 includes an energized line detection device 112 and motor electronics 114. Energized line detection device 112 is configured to sense which one of lines L1, L2, or L3 is energized, as is described in more detail herein. Energized line detection device 112 transmits a signal including power and operation instruction information to motor electronics 114, which conditions the power and determines whether to apply a speed or a torque to electric motor 108 based on the operational information.

Figure 3:
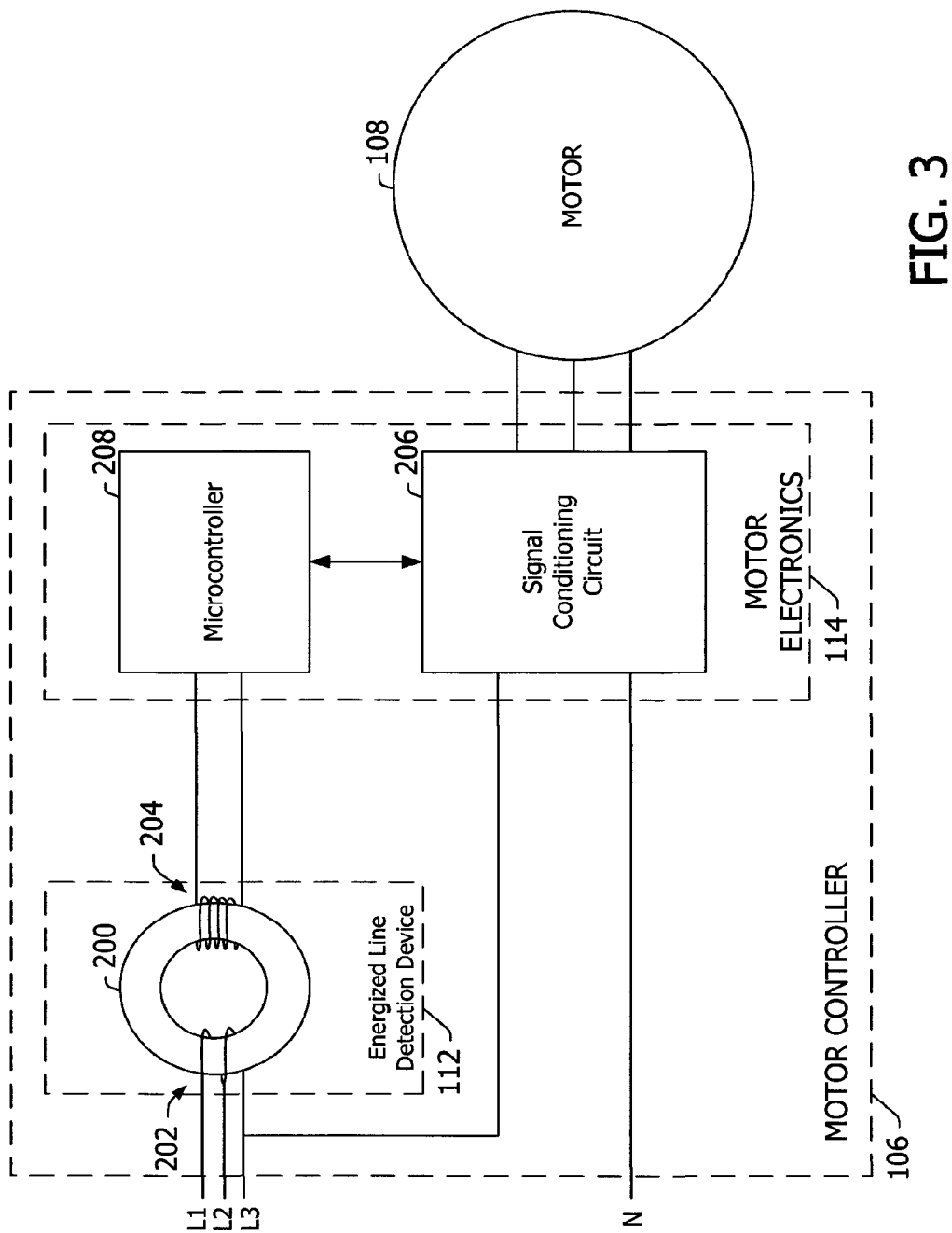
FIG. 3 is a schematic diagram of the motor controller of the fan motor control system shown in FIG. 2.
Figure 4:
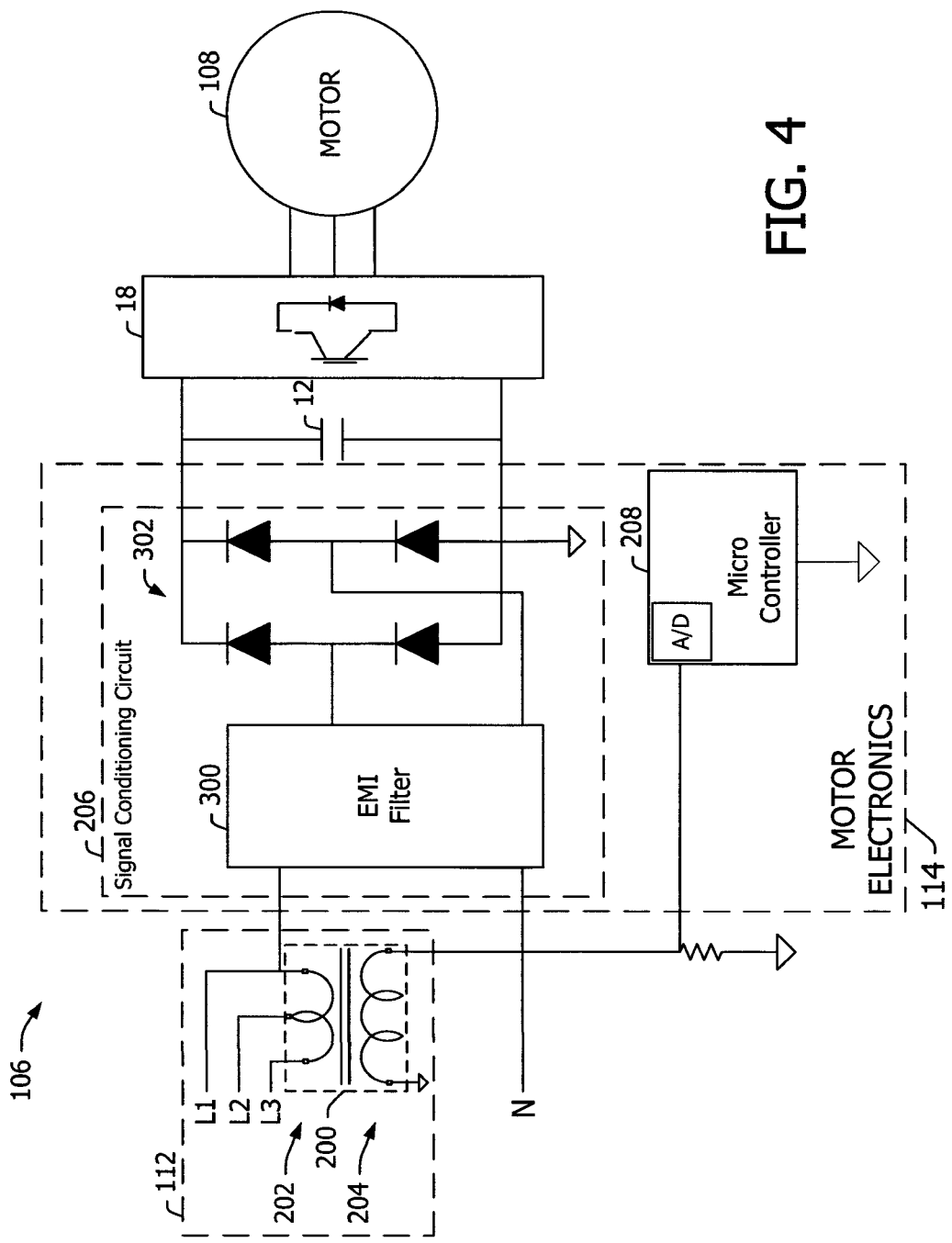
FIG. 4 is a circuit diagram of the motor controller shown in FIG. 2.

FIG. 3 is a schematic diagram of motor controller 106 of fan motor control system 100 (both shown in FIG. 2). FIG. 4 is a circuit diagram of motor controller 106 (shown in FIG. 2). In the exemplary embodiment, motor controller 106 includes energized line detection device 112 and motor electronics 114 (both shown in FIG. 2).

In the exemplary embodiment, energized line detection device 112 is a transformer 200 that includes a primary winding 202 and a secondary winding 204. Primary winding 202 includes a tap 206 at each turn for coupling to the lines of HVAC system controller 104. In the exemplary embodiment, wherein system 100 is a three-speed system, transformer 200 includes a tap L1', L2', and L3' for each of lines L1, L2, and L3, respectively. More specifically, in the exemplary embodiment, tap L1' is not on a turn of transformer 200, so operation at the lowest speed (i.e., line L1) is assumed from the state of electric motor 108 being powered. Tap L2' is at a first turn of primary winding 202 and L3' is at a second turn of primary winding 202. Operation at the intermediate speed (i.e., line L2) or top speed (i.e., line L3) is determined by current sourcing taps L2' and L3' of primary winding 202.

In the exemplary embodiment, secondary winding 204 is used to measure a magnitude of voltage produced by the current in primary winding 202. The magnitude of the current measured is used to determine which line is energized. The voltage is isolated from the high voltage input at L1, L2, or L3 (i.e., 120V or 240V) from HVAC system controller 104 to a low voltage signal output to motor electronics 114. For example, in one embodiment, where tap L2' is at turn 1 of primary winding 202, when line L2 is energized, a hypothetical 1V signal is measured at secondary winding 204 as a reflection of the magnitude of current supplied to motor controller 106. Where tap L3' is at turn 2 of primary winding 202, when line L3 is energized, a hypothetical 2V signal is measured at secondary winding 204 for the same magnitude of current that was supplied by tap L2. Accordingly, a single low-voltage isolated signal is provided to motor electronics 114.

In an alternative embodiment, transformer 200 may be a voltage transformer. Power diode doublers (not shown) may be included with the use of a voltage transformer to permit detection of the relays that provide both the power to electric motor 108 and the operation instruction information.

In the exemplary embodiment, motor electronics 114 include a signal conditioning circuit 206 and a microprocessor 208. Electronic motor 108 is powered by line voltage provided from line L1 to neutral line N input to signal conditioning circuit 206. Signal conditioning circuit 206 includes an electromagnetic interference (EMI) filter 300 for filtering high frequency components produced by motor electronics 114 from power supply 110 (shown in FIG. 2) and a rectifier 302 for producing a rectified AC voltage used to power electric motor 108.

Microprocessor 208 receives the signal output by transformer 200 and compares the signal to the known load current supplied to the motor, thereby determining which of the input line taps is supplying current. This determination is effected by the extensive calculation capability of microprocessor 208 and the realization of the relative change in current supplied as the single phase input voltage cycles through its range of instantaneous voltages. Based on the comparison, microprocessor 208 applies an operating profile stored in a memory device of microprocessor 208. The operating profile may apply a constant torque, a constant speed, or a constant airflow. The operating profile may also include a variation in time or profile including slew rates and/or ramps.

Applied to the three-speed motor example described above, when line L1 (does not have a turn on winding 202) is energized, motor electronics 114 and electric motor 108 are energized. The signal output from transformer 200 is zero. Microprocessor 208 determines the line L1 was energized and commands electric motor 108 to operate in fan mode. If line L2 (having 1 turn) is energized, transformer 200 outputs a signal to microprocessor 208. Microprocessor 208 determines the line L2 was energized and commands electric motor 108 to operate in heating mode. If line L3 (having 2 turns) is energized, transformer 200 outputs a higher signal that when L2 is energized to microprocessor 208. Microprocessor 208 determines the line L3 was energized and commands electric motor 108 to operate in cooling mode.

In the exemplary embodiment, the voltage input across lines L1 and L3 is a programming voltage. The programming voltage is applied with a higher than line frequency and has a coded sequence to enable detection by motor controller 106 as a programming instruction and not due to normal operation. The programming voltage is applied, in addition to a voltage from L1 to N, to power microprocessor 208.

Figure 5:
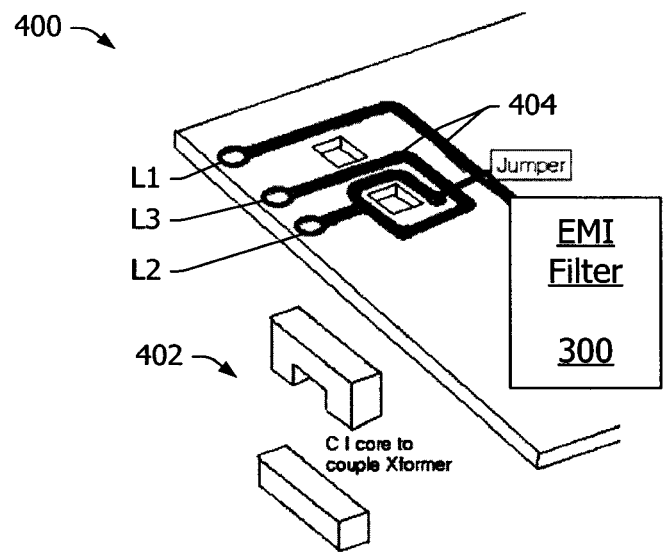
FIG. 5 is a top view of an exemplary printed circuit board (PCB) that may be used to program the microprocessor shown in FIG. 3.
Figure 6:
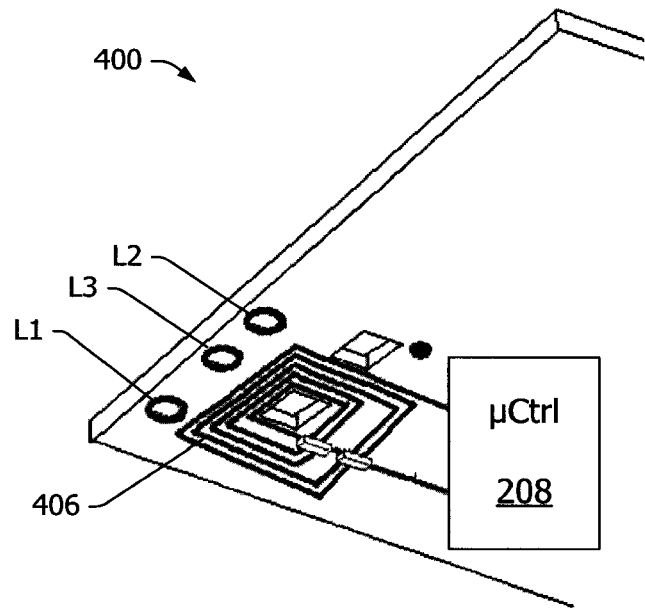
FIG. 6 is a bottom view of the PCB shown in FIG. 5.

FIG. 5 is a top view of a layout of an exemplary printed circuit board (PCB) 400 having a transformer core 402 that may be used to program microprocessor 208 (shown in FIG. 3). FIG. 6 is a bottom view of PCB 400. The top view shown in FIG. 5 is the primary side of transformer core 402. On the primary side, PCB 400 includes primary windings 404, or traces 404. The bottom view shown in FIG. 6 is the secondary side of transformer core 402. On the secondary side, PCB 400 includes secondary windings 406, or traces 406. Using traces 404 and 406 on a PCB facilitates a reduction in size of motor controller 106 and eliminates the use of insulated wire windings.

When installed on PCB 400, the combination of transformer core 402, primary windings 404, and secondary windings 406 constitute a current transformer on PCB 400. The current transformer is used to detect which line tap L1, L2, or L3 is powering microprocessor 208

In the exemplary embodiment, lines L1, L2, and L3 are coupled to transformer core 402. Additionally, line L1 is coupled to EMI filter 300 of signal conditioning circuit 206 (shown in FIG. 4). An output of transformer core 402 is coupled to an analog-to-digital (A/D) input of microprocessor 208 through traces 404 on the primary side of PCB 400 opposite the primary attachment points for lines L2 and L3.

In the exemplary embodiment, motor controller 106 using transformer core 402 operates in the same manner as motor controller 106 using transformer 200, as described above. When programming motor controller 106 for the selection of a run profile option, motor controller 106 is powered by line voltage from line L1 to neutral N. A programming voltage is applied across line L1 to line L3. The voltage is applied with a higher than line frequency and coded sequence to enable detection by the microprocessor 208 as a programming instruction and not due to normal operation. After having accepted the programming input, microprocessor 208 acknowledges the input by outputting a predetermined sequence of motor output speed that confirms the option selected by the programming input.

The use of PCB 400 enables an OEM or field installer making programming selections into a replacement for an induction motor without the requirement for direct wired connection to microprocessor 208. Programming without direct wired connection facilitates reducing the difficulty of making the profile option choice and reducing the electrical hazard to microprocessor 208.

Figure 7:
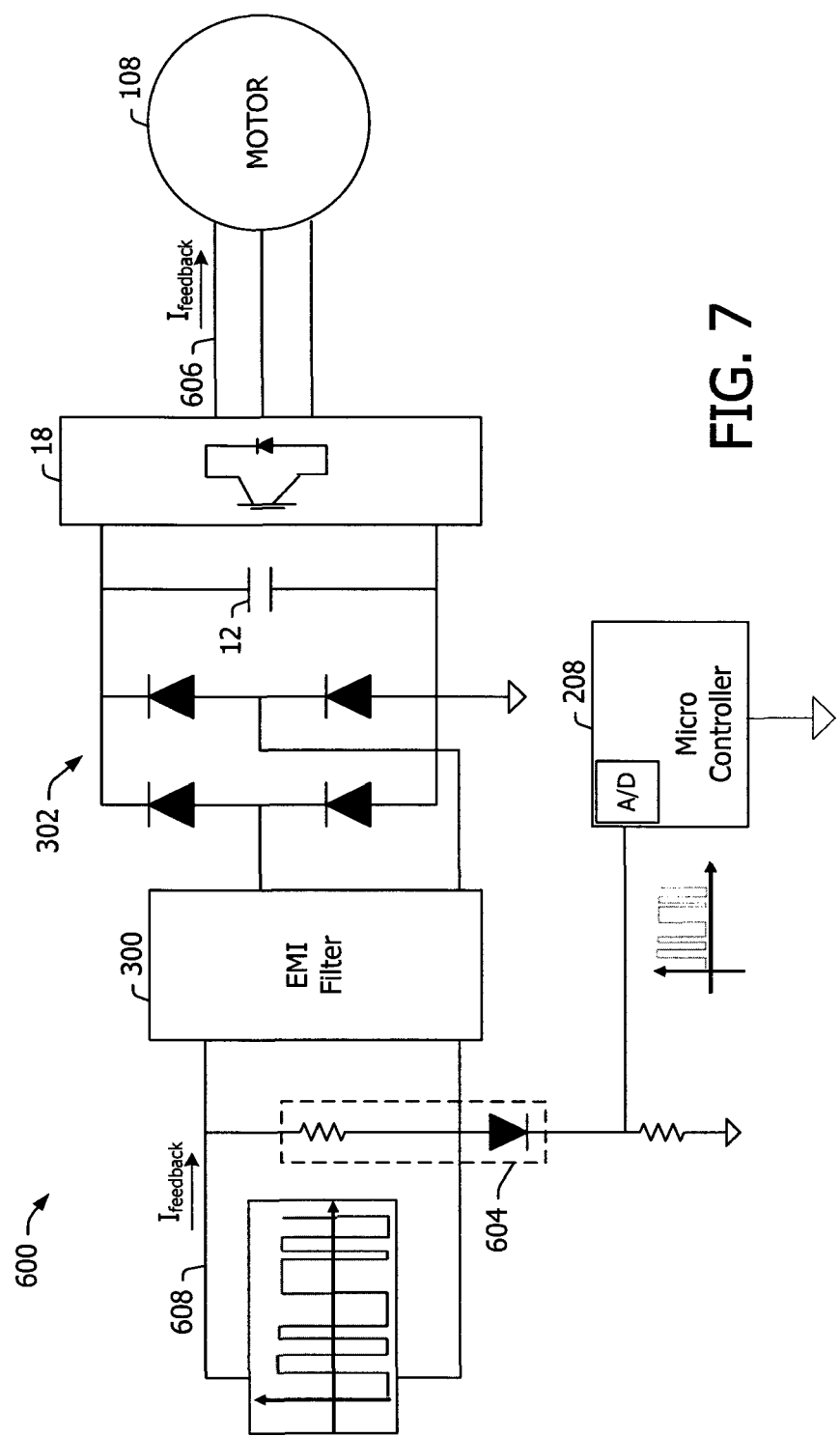
FIG. 7 illustrates an alternative embodiment of the motor controller shown in FIGS. 2-4.

FIG. 7 illustrates an alternative embodiment 600 of motor controller 106 (shown in FIGS. 2-4). Components of motor controller 600 that are identical to components of motor controller 106 are described using the same reference numbers as used in FIGS. 2-4.

In the exemplary embodiment, motor controller 600 includes a square wave voltage source 602. A programmer or OEM programming electric motor 108 provides a programming voltage source using a square wave voltage source 602. The source voltage is rectified by rectifier 302 (shown in FIG. 4) and used to power electric motor 108. The programming voltage is rectified by a second rectifier 604. The programming voltage is then decoded by microprocessor 208 to extract a program to be installed.

After decoding, microprocessor 208 generates pulses of current in motor windings 606. The pulses of current in windings 606 generate feedback pulses of current in the AC line input at 608. The feedback pulses can be used as acknowledgement pulses for programming and/or communication between a programmer and motor controller 600.

The embodiments described herein provide a highly efficient ECM that may be retrofit for existing HVAC systems and does not require major changes in OEM hardware. The embodiments described herein provide a motor that does not utilize large, unreliable electrolytic filter capacitors that generate large inrush currents to the motor controller. Further, the embodiments enable use of the OEM's system relays to power the motor without the inrush current stress and still communicate the desired speed to the motor. Communication of the desired speed if effected to the motor control through the use of a current transformer having taps in the primary winding available for connection to the various control relays such that the voltage applied to the isolated secondary changes according to the relay used to power the ECM. The embodiments provide a replacement for PSC motors that has a more flexible electronically controlled motor that benefits from a capability to select different motor run profile options either by the OEM or field installer utilizing the replacement. This capability is implemented without direct wire connection to the controller microprocessor to reduce the difficulty of making the profile option choice and reduce the electrical hazard to microprocessor.

A technical effect of the methods and systems described herein may include one or more of: (a) receiving power from an alternating current (AC) power source by at least one of a first power input, a second power input, and a third power input; (b) sensing, by an energized line detection device, which of the power inputs received power from the AC power source; (c) receiving an isolated signal output by the energized line detection device at a microprocessor; and (d) determining an operating profile for the electric motor based on the isolated signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor controller configured to be coupled to an electric motor, said controller configured to control the electric motor to produce torque when direct current (DC) link voltage has up to 100% voltage ripple; said controller comprising:

a first power input connection, a second power input connection, and a third power input connection, each of said first, second, and third power input connections selectively and separately couplable to a single-phase alternating current (AC) power source by a system controller based on a commanded operating mode of a plurality of operating modes for the electric motor received from a thermostat, each of said first, second, and third power input connections associated with a different operating mode, wherein the same amount of AC input voltage from the AC power source is applied regardless of which of said first, second, and third power input connections is activated;

an energized line detection device comprising a single current transformer that includes a primary winding and a secondary winding, each of said first, second, and third power input connections coupled to a respective turn of said primary winding such that a magnitude of voltage generated by transforming current at said primary winding and applied to said secondary winding varies according to whichever of said first, second, and third power input connections is coupled to the AC source by the system controller, said secondary winding configured to output an isolated stepped-down voltage; and a microprocessor coupled downstream from said energized line detection device and configured to:
measure the magnitude of the voltage output at said secondary winding;
determine which of said first, second, and third power input connections is coupled to the AC power source by the system controller based on the magnitude of the voltage;
associate the power input connection determined to be coupled to the AC power source with the particular operating mode commanded by the thermostat; and
apply an operating profile to drive the electric motor in accordance with the commanded operating mode.

2. A controller in accordance with claim 1, wherein to apply an operating profile for the electric motor, said microprocessor is configured to:
compare the measured magnitude of the voltage to a magnitude of load current supplied to the electric motor; and
apply the operating profile to the electric motor based on the comparison.

3. A controller in accordance with claim 1, wherein said energized line detection device comprises a printed circuit board comprising:
a top portion including a trace for each of said first, second, and third power input connections;
a bottom portion including an output trace; and
a transformer having a magnetic core extending at least partially through said PCB, wherein said top portion is a transformer primary and said second side is a transformer secondary.

4. A controller in accordance with claim 3, wherein said output trace is coupled to one of said microprocessor and an analog-to-digital input of said microprocessor.

5. A controller in accordance with claim 4, wherein to apply an operating profile for the electric motor, said controller is configured to:

receive a programming voltage in at least one of said first, second, and third power input connections in addition to the power from the AC power source; and apply the operating profile to the electric motor based on the programming voltage.

6. A controller in accordance with claim 5, wherein the programming voltage has a higher than line frequency and has a coded sequence to enable detection by said microprocessor as a programming instruction.

7. A controller in accordance with claim 1, further comprising a signal conditioning device coupled to said first power input connection, said signal conditioning device configured to convert AC power from the AC power source to a DC power for operating the electric motor.

8. A controller in accordance with claim 1, wherein to apply an operating profile, said microprocessor is configured to apply one of a constant torque, a constant speed, and a constant airflow.

9. A method of programming an electric motor using a motor controller configured to control the electric motor to produce torque when direct current (DC) link voltage has up to 100% voltage ripple, said method comprising:

receiving power from a single-phase alternating current (AC) power source by at least one of a first power input connection, a second power input connection, and a third power input connection each of said first, second, and third power input connections selectively and separately couplable to the AC power source by a system controller based on a commanded operating mode of a plurality of operating modes for the electric motor received from a thermostat, each of said first, second, and third power input connections associated with a different operating mode, wherein the same amount of AC input voltage from the AC power source is applied regardless of which of said first, second, and third power input connections is activated;

coupling each of the first, second, and third power input connections to an energized line detection device that includes a single current transformer having a primary winding and a secondary winding, each of the first, second, and third power input connections coupled to a respective turn of the primary winding;

generating, by the energized line detection device, an isolated stepped-down voltage at the secondary winding by transforming current induced at the primary winding such that a magnitude of voltage applied to the secondary winding varies according to whichever of the first, second, and third power input connections is coupled to the AC power source by the system controller;

measuring, by a microprocessor, the magnitude of the voltage output at the secondary winding;

determining, by the microprocessor, which of the first, second, and third power input connections is coupled to the AC power source by the system controller based on the magnitude of the voltage;

associating, by the microprocessor, the power input connection determined to be coupled to the AC power source with the particular operating mode commanded by the thermostat; and applying an operating profile to drive the electric motor in accordance with the commanded operating mode.

10. A method in accordance with claim 9, wherein applying an operating profile for the electric motor comprises:

measuring a magnitude of voltage output by the secondary winding;

comparing the measured magnitude of voltage to a magnitude of load current supplied to the electric motor; and applying an operating profile to the electric motor based on the comparison.

11. A method in accordance with claim 9, wherein applying an operating profile for the electric motor comprises applying one of a constant torque, a constant speed, and a constant airflow.

12. A heating, ventilation, and air conditioning (HVAC) fan motor control system comprising:

a thermostat configured to transmit a command signal that includes a commanded operating mode of a plurality of operating modes;

an HVAC system controller configured to receive the command signal from said thermostat and determine the commanded operating mode of said HVAC fan motor control system;

an electric fan motor;

an electric motor controller coupled to said electric motor, said motor controller configured to control the electric motor to produce torque when direct current (DC) link voltage has up to 100% voltage ripple; said motor controller comprising:

a first power input connection, a second power input connection, and a third power input connection, each of said first, second, and third power input connections selectively and separately couplable to a single-phase alternating current (AC) power source by said HVAC system controller based on the commanded operating mode of the electric motor, each of said first, second, and third power input connections of associated with a different operating mode, wherein the same amount of AC input voltage from the AC power source is applied regardless of which of said first, second, and third power input connections is activated;

an energized line detection device comprising a single current transformer that includes a primary winding and a secondary winding such that a magnitude of voltage generated by transforming current at said primary winding and applied to said secondary winding varies according to whichever of said first, second, and third power input connections is coupled to the AC source by the system controller, said secondary winding configured to output an isolated stepped-down voltage;

a microprocessor coupled downstream from said energized line detection device, said microprocessor configured to:

measure the magnitude of the voltage output at said secondary winding;

determine which of said first, second, and third power inputs is coupled to the AC power source by the system controller based on the measured magnitude;

associate the power input connection determined to be coupled to the AC power source with the particular operating mode commanded by said thermostat; and apply an operating profile to drive the electric motor in accordance with the commanded operating mode.

13. A system in accordance with claim 12, wherein to apply an operating profile for the electric motor, said microprocessor is configured to:

compare the measured voltage to a known load current supplied to the electric motor; and apply the operating profile to the electric motor based on the comparison.

14. A system in accordance with claim 12, further comprising a signal conditioning device coupled to said first power input connection, said signal conditioning device configured to convert AC power from the AC power source to a DC power for operating said electric motor.

\* \* \* \* \*